United States Patent
Meitinger et al.

(10) Patent No.: US 10,773,629 B2
(45) Date of Patent: Sep. 15, 2020

(54) CONSTRUCTION MACHINE

(71) Applicant: Liebherr-Hydraulikbagger GmbH, Kirchdorf (DE)

(72) Inventors: Bernhard Meitinger, Buxheim (DE); Volker Hilsenbeck, Leutkirch (DE)

(73) Assignee: Liebherr-Hydraulikbagger GmbH, Kirchdorf (DE)

( * ) Notice: Subject to any disclaimer, the term of this patent is extended or adjusted under 35 U.S.C. 154(b) by 100 days.

(21) Appl. No.: 15/997,069

(22) Filed: Jun. 4, 2018

(65) Prior Publication Data
US 2019/0023170 A1 Jan. 24, 2019

(30) Foreign Application Priority Data

Jul. 11, 2017 (DE) .................. 10 2017 115 537

(51) Int. Cl.
*B60P 1/16* (2006.01)
*B60P 1/04* (2006.01)
*F15B 11/05* (2006.01)
*F15B 13/04* (2006.01)

(52) U.S. Cl.
CPC .............. *B60P 1/162* (2013.01); *B60P 1/165* (2013.01); *B60P 1/045* (2013.01); *F15B 11/05* (2013.01); *F15B 13/0417* (2013.01); *F15B 2211/55* (2013.01); *F15B 2211/6313* (2013.01); *F15B 2211/65* (2013.01)

(58) Field of Classification Search
CPC ........... B60P 1/162; B60P 1/045; B60P 1/165; F15B 2211/65; F15B 2211/6313; F15B 2211/55; F15B 13/0417; F15B 11/05
See application file for complete search history.

(56) References Cited

U.S. PATENT DOCUMENTS

| | | | | |
|---|---|---|---|---|
| 4,206,688 A | * | 6/1980 | Haak | F15B 13/01 137/596.2 |
| 5,929,389 A | * | 7/1999 | Keuper | G01G 19/083 177/141 |
| 6,289,917 B1 | * | 9/2001 | Gerstenberger | G05D 11/03 137/101 |
| 8,752,372 B2 | * | 6/2014 | Ramler | F15B 11/024 60/461 |
| 2009/0308068 A1 | * | 12/2009 | Yoshino | E02F 9/2203 60/468 |

(Continued)

FOREIGN PATENT DOCUMENTS

| | | |
|---|---|---|
| DE | 3709504 A1 | 10/1988 |
| DE | 102004033315 A1 | 2/2006 |
| EP | 2836394 B1 | 2/2015 |

*Primary Examiner* — Russell Frejd
(74) *Attorney, Agent, or Firm* — Dilworth & Barrese, LLP

(57) ABSTRACT

The present invention relates to a construction machine having at least one material receiver that is adjustable by means of at least one hydraulic actuator for unloading, with the required feed pressure for the actuator actuation being able to be provided by a hydraulic circuit of the construction machine and with the feed pressure being able to be limited to a limit pressure by means of at least one pressure limiting device, wherein the construction machine comprises a weighing system for determining the current load weight of the material receiver; and a control for the hydraulic circuit is provided that adapts the limit pressure of the pressure limiting device in dependence on the determined load weight.

12 Claims, 6 Drawing Sheets

(56) References Cited

U.S. PATENT DOCUMENTS

| | | | |
|---|---|---|---|
| 2014/0039767 A1* | 2/2014 | Jensen | B60K 23/0808 |
| | | | 701/50 |
| 2015/0051798 A1 | 2/2015 | Cronholm | |
| 2016/0265187 A1* | 9/2016 | Baba | E02F 3/435 |
| 2017/0001551 A1* | 1/2017 | Bristow | B66F 9/065 |
| 2017/0113699 A1* | 4/2017 | Stander | B60W 10/04 |
| 2018/0073524 A1* | 3/2018 | Schmidt | F15B 1/265 |
| 2018/0079634 A1* | 3/2018 | Petronek | B66F 9/22 |

* cited by examiner

CONSTRUCTION MACHINE

BACKGROUND OF THE INVENTION

The invention relates to a construction machine having at least one material receiver that is adjustable by means of at least one hydraulic actuator for unloading, with the required feed pressure for the actuator actuation being able to be provided by a hydraulic circuit of the construction machine and with the feed pressure being able to be limited to a limit pressure by means of at least one pressure limiting device.

An example for construction machinery of the category is a dump truck, in particular an articulated dump truck. This machinery serves for earthmoving and has a loading surface in the form of a so-called bed as a material receiver. The bed provided for receiving the load is supported in a tiltable manner at the chassis via one or more hydraulic cylinders to unload the received load by lifting the bed. The required energy for the tilt cylinders is provided by the internal hydraulics of the machine.

To avoid an overload of individual hydraulic components, the hydraulics typically comprise at least one pressure limiting device that limits the system pressure to a maximum pressure level. The predefined maximum pressure level determines the maximum possible tilt force of the actuators for lifting the bed. The dimensioning of the maximum pressure level in practice depends on the required tilt force for lifting the bed with a permitted maximum load. The maximum permitted tilt pressure is consequently permanently set to a predefined fixed value at the control valve and is independent of the current operating state of the machine.

The aforesaid solution can, however, be problematic with an unfavorable weight distribution of the received load on the bed since in this case a higher tilt force can optionally be required to lift the bed that can, however, not be reached due to the pressure limitation. In this case, the hydraulics cannot apply the required power, not even when the current load of the bed does not exceed the permitted upper limit.

The same applies to the practical case that occurs as a rule in which the dump truck reverses to a ramp to unload the loaded material. A slanted position of the construction machine and a displacement of the center of gravity of the load material thereby caused occurs due to the ramp slope. This can equally result in an increase in the required tilt pressure for the unloading procedure. Under certain circumstances the machine position or the vehicle inclination then has to be changed to make an unloading of the bed possible.

European patent EP 2 836 394 takes up this problem and provides as the solution to the problem a switching over of the regular maximum tilt pressure to a second higher maximum pressure when a predefined angle of inclination of the machine is exceeded. An unloading of the material receiver is admittedly hereby made possible with an increased tilt pressure; however, this solution is not very flexible with only two limit values. The teaching of this patent can also not solve the problem that occurs with an disadvantageous load distribution.

The above-described problem can also occur in practice with conventional excavators since here a limit value is also required for the hydraulic pressure for actuating individual actuators to raise the excavator bucket so that under certain circumstances an actuation of the excavator bucket, of the grab, or of another attachment tool or of the excavator arm may also not be possible with a permitted load. Excavators thus also represent construction machinery of the category as part of the invention in which the material receiver is formed by the excavator bucket, by the grab or similar.

SUMMARY OF THE INVENTION

The present object now comprises providing an alternative solution for the problem outlined above, in particular for use with dump trucks or excavators.

This object is achieved by a construction machine in accordance with the features herein. Advantageous embodiments of the construction machine are also the subject herein.

It is proposed in accordance with the invention to add a weighing system to a construction machine of the category in order thereby to be able to detect the current load status, i.e. the load weight of the material receiver of the construction machine. The limit pressure of the pressure limiting device for the control of the actuators should then be adapted in dependence on the determined load weight by means of a control for the hydraulic circuit.

Unlike the prior art, no use is made of a maximum pressure fixed at the hardware side, but a flexible value is rather selected in dependence on the actual load of the construction machine. The flexible adaptation of the limit pressure ensures that an actuation of the actuators and an unloading of the construction machine is also possible when the material receiver is loaded with the maximum permitted load, but a higher pressure is required to actuate the material receiver due to a disadvantageous load distribution and/or a disadvantageous vehicle inclination.

A dump truck, in particular an articulated dump truck, whose bed can be lifted or tilted for unloading by means of at least one hydraulic actuator, preferably by means of at least one hydraulic cylinder, is considered a construction machine, for example. A corresponding weighing system is installed close to the bed of the dump truck to be able to detect the load received by the bed.

Alternatively, the construction machine can also be an excavator whose at least one actuator, preferably a hydraulic cylinder, serves the actuation of the excavator bucket, of the grab, or of a similar attachment tool, or of the excavator arm. A corresponding weighing system can also be installed at the bucket, etc. or at the excavator arm here.

In accordance with an advantageous embodiment of the invention, the control sets the limit pressure to an associated reference limit pressure in dependence on the measured load weight. The reference limit pressure here preferably corresponds to the required pressure that is typically required for actuating a material receiver loaded in the maximum permitted range when the vehicle has no real inclination with respect to the horizontal or when an unproblematic load distribution is present.

The reference limit pressure can be determined or calculated, for example, for the individual case by the control. Alternatively, a database having stored reference limit pressures can be integrated in the control or can invoke corresponding entries from an external database via an interface. The storing of the values is conceivable in tabular form in which corresponding reference limit pressures are associated with different load weights.

The installed pressure limiting device of the hydraulic circuit can comprise at least one pressure relief valve interconnected with the feed pressure line. The pressure relief valve opens from a certain pressure level in the feed pressure line onward and relieves the inlet of the actuator toward the low pressure side (tank). An overload of individual hydraulic components by too high a pressure level is prevented. The pressure relief valve is ideally precontrollable to be able to variably set the desired opening pressure, i.e. the limit pressure, indirectly or directly by the control. The precontrol can take place either electrically or hydraulically. In accordance with a preferred embodiment, the control is connected to the precontrol of the pressure relief valve via a proportional regulating valve, whereby a continuous adaptation of the opening pressure and thus of the limit pressure is preferably possible.

Under certain circumstances or with a corresponding machine inclination or load distribution on the material receiver, the limit pressure of the pressure limitation device set by the control in dependence on the determined load weight can initially not be sufficient to enable a proper adjustment of the material receiver. This can also be the case here when the load weight does not exceed the permitted maximum load.

An adjustment of the material receiver that is not proper can be present when, for example, the reached actual adjustment speed of the material receiver remains below a desired nominal adjustment speed of the material receiver. A suitable sensor system for detecting the achieved actual adjustment speed whose measured values are provided to the control is preferably provided for this reason. The programming of the control carries out a constant comparison of the actual speed and of the desired speed. If the desired nominal adjustment speed is not reached, the control preferably initiates an adaptation or increase of the previously set limit pressure. An increase of the set limit pressure should, however, only be initiated when the determined load weight remains below a permitted maximum load weight of the construction machine. This is necessary to prevent an improper exceeding of the maximum load weight.

An increase of the increased limit pressure by the control can also be appropriate when the current feed pressure, i.e. the current limit pressure, is not sufficient to adjust the material receiver for unloading. It can then be assured by an appropriate increase of the limit pressure that the adjustment of the material receiver can nevertheless be achieved. An increase of the limit pressure can also only be released in this case when the determined load weight is below the permitted maximum load weight.

In accordance with a further advantageous embodiment of the invention, the construction machine can be equipped with at least one inclination sensor for detecting the vehicle inclination with respect to the horizontal. The measured values of the inclination sensor are likewise communicated to the control that can take this into account on the adaptation of the limit pressure. An adaptation of the original reference limit pressure can thereby take place in dependence on the inclination value.

It is necessary for the protection of the involved hydraulic components to define a fixed maximum limit pressure that may also not be exceeded by the control in accordance with the invention. It is sensible for the further protection from an improper use of the construction machine due to overload to define different maximum limit pressures, namely a first maximum limit pressure for the case that the determined load weight does not exceed a permitted maximum load weight of the construction machine and a second maximum limit pressure for the alternative case that the determined load weight exceeds a permitted maximum load weight of the construction machine. The second maximum limit pressure is sensibly smaller than the first maximum limit pressure. It is thereby ensured that a temporary increase of the limit pressure is only possible if the permitted load weight is actually observed.

The subject matter of the present invention equally relates to a method of operating a construction machine for the earthmoving having at least one material receiver. The material receiver is adjustable by means of at least one hydraulic actuator, with the hydraulic feed pressure of the actuating being able to be limited in accordance with the invention to a limit pressure that is determined in dependence on the detected actual load weight of the material receiver in working operation.

In accordance with an advantageous embodiment of the method, the set limit pressure is increased up to a maximum limit pressure if the actual load weight does not exceed a permitted load weight and the resulting adjustment force for the adjustment movement of the material receiver is not sufficient and/or the resulting actual adjustment speed is below a nominal adjustment speed and/or a certain inclination of the vehicle with respect to the horizontal is recognized.

In accordance with a preferred embodiment of the invention, the method is performed on a construction machine in accordance with the present invention or with an advantageous embodiment of the invention. The same advantages and properties accordingly result for the method in accordance with the invention as have already been explained above with reference to the construction machine in accordance with the invention. A repeat description is dispensed with for this reason.

BRIEF DESCRIPTION OF THE DRAWINGS

Further advantages and properties of the invention will be explained in more detail in the following with reference to an embodiment shown in the drawings. There are shown.

DESCRIPTION OF THE PREFERRED EMBODIMENTS

Figure 1:
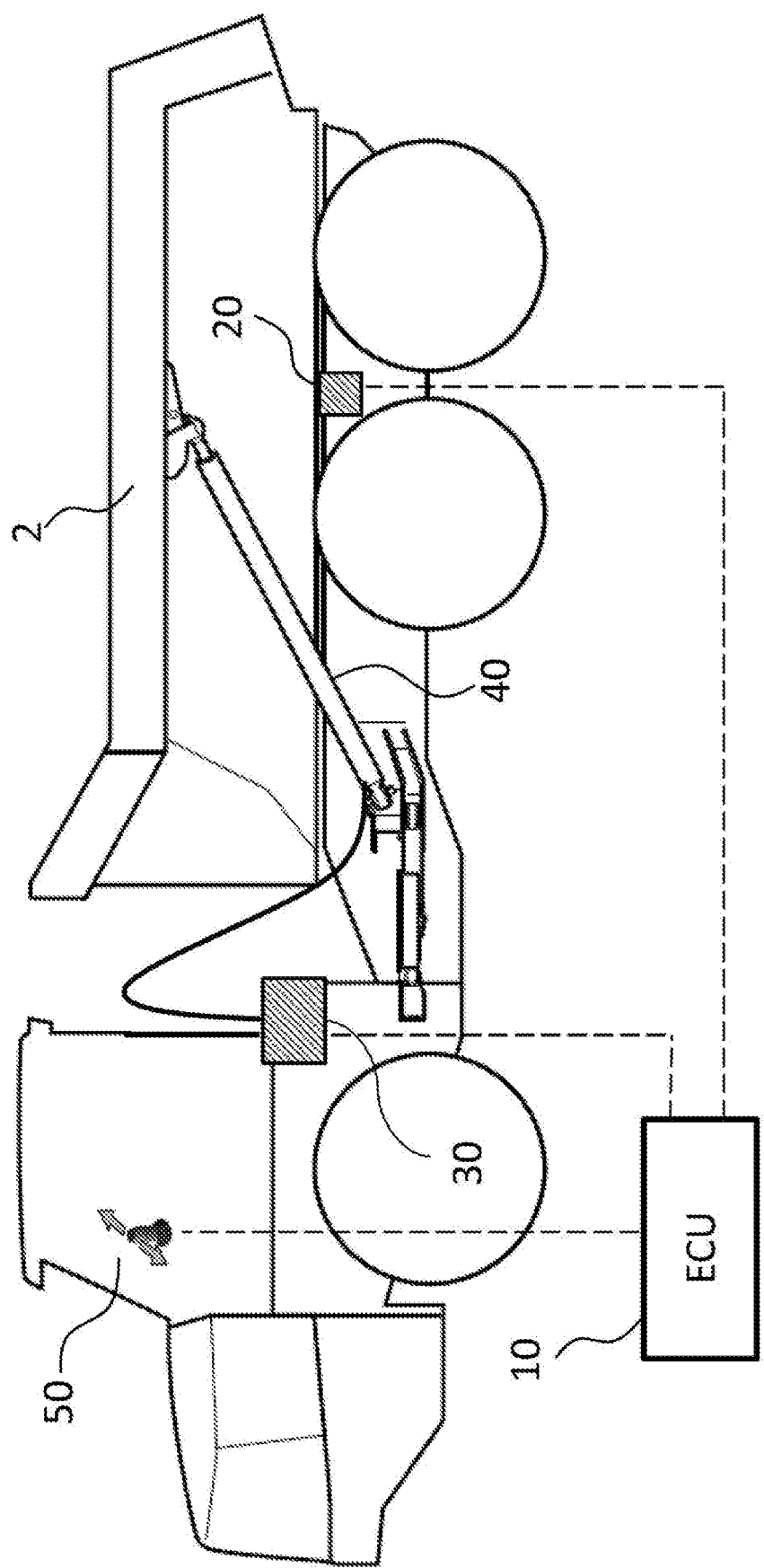
FIG. 1: a schematic representation of the dump truck in accordance with the invention.

FIG. 1 shows a sketched representation of the construction machine in accordance with the invention in the form of an articulated dump truck. The dump truck comprises a bed 2 that is tiltably supported at the chassis and that can be lifted by means of the hydraulic drive in the form of at least one hydraulic cylinder 40 to dump the received load. The actuation of the hydraulic drive 40 takes place via a control lever 50 within the operators cabin of the dump truck.

A weighing system 20 is installed below the bed 2 that detects the current load weight of the bed and forwards it to the vehicle control 10 (ECU=engine control unit). The latter also receives the control signals of the control lever 50. A control output of the ECU 10 is connected to the hydraulic control 30 by means of which individual components such as valves etc. of the hydraulic circuit can be controlled.

Figure 4:
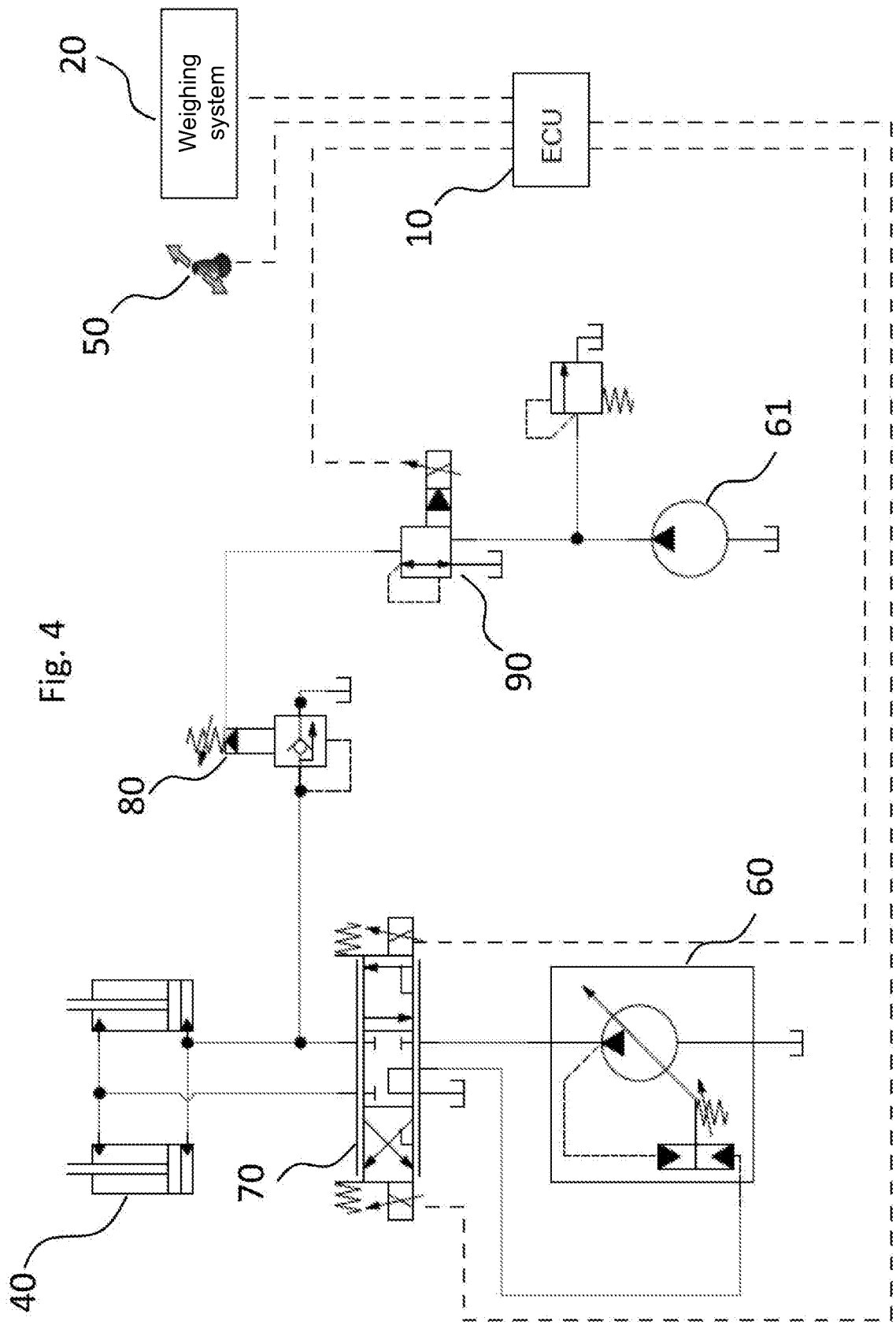
FIG. 4: a hydraulic circuit diagram of the construction machine in accordance with the invention.

A plugging diagram of the hydraulics can be seen from FIG. 4. The two hydraulic cylinders 40 for actuating the bed are shown. The required feed pressure for the piston rod movement is provided by the adjustment pump 60 that is interconnected to the two hydraulic drives 40 via the ski selector valve 70. The cylinders 40 can be moved in or out or stopped in the current position via the three switching states of the ski selector valve 70. The high pressure side of the pump 60, i.e. the high pressure line to the cylinders 40, is connected to the hydraulic tank via a pressure relief valve 80. If the pressure level in the high pressure supply exceeds the opening pressure of the pressure relief valve 80, the line toward the tank is relieved.

The pressure relief valve 80 is hydraulically precontrolled, with the control pressure at the control input of the pressure relief valve 80 being settable via the proportional pressure regulating valve 90 that is connected to the hydraulic pump 61 at the input side. The pressure regulating valve 90 is electrically actuable.

As already previously explained, the ECU 10 receives the sensor signal of the weighing system 20 and of the control lever 50. The ECU 10 is connected via control outputs to the ski selector valve 70 for actuating the hydraulic cylinders 40 and also to the pressure regulating valve 90 for setting the limit pressure of the pressure relief valve 80. The control takes place via the hydraulic control 30 that was not pictured in the circuit diagram of FIG. 4 for better clarity. The ski selector valve 70 is opened proportionally to the demand that is determined by the excursion of the control lever 50. The regulating pump 60 generates the required hydraulic amount as required by the LS signal that is generated i the ski selector valve 70. The tilt cylinders 40 lift the bed 40 at the required desired tilt speed.

In working operation, the actual load received on the bed 2 is detected by the weighing system 20 and is transmitted to the control 10. After actuating the control lever 50, it compares the detected actual load with a defined maximum permitted load value before carrying out the dumping procedure. For the case that the actual load is smaller than or equal to the maximum permitted value, the signal is forwarded from the control 10 to the hydraulic control 30 for adapting the tilt pressure. The individual method steps to be carried out will be explained in the following with reference to the flowcharts of FIGS. 2a-2c that represent different application cases.

Figure 2A:
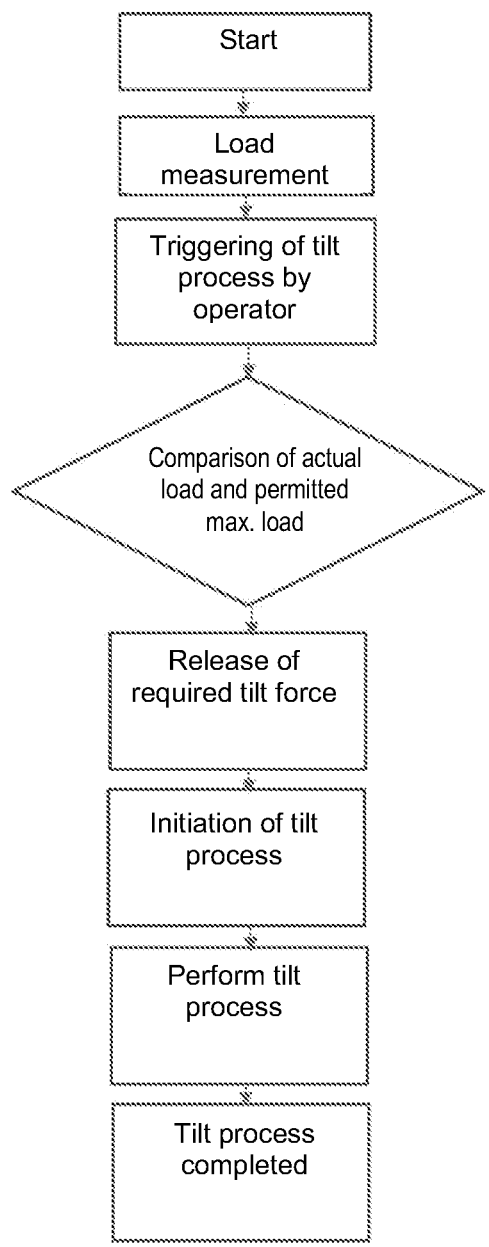
FIG. 2a: a flowchart of the method in accordance with the invention for a specific application case.

FIG. 2a shows the flowchart for the standard practical case. The weighing device 20 permanently detects the current load of the bed 2. After the triggering of the tilt process by the operator using the control element 50, a comparison of the measured actual load with a permitted load stored in the control 10 takes place. If the actual load is smaller than or equal to the maximum permitted load, the control 10 determines the required tilt force for the detected load and sets the reference limit pressure at the pressure relief valve 80 indirectly by actuating the pressure regulating valve 90. The determined required tilt force for lifting the bed 2 is thereby released. The initiation of the tilt process by the hydraulic control device 30 subsequently takes place and the tilt process is carried out by actuating the tilt cylinders 40 until it is completed.

Figure 2B:
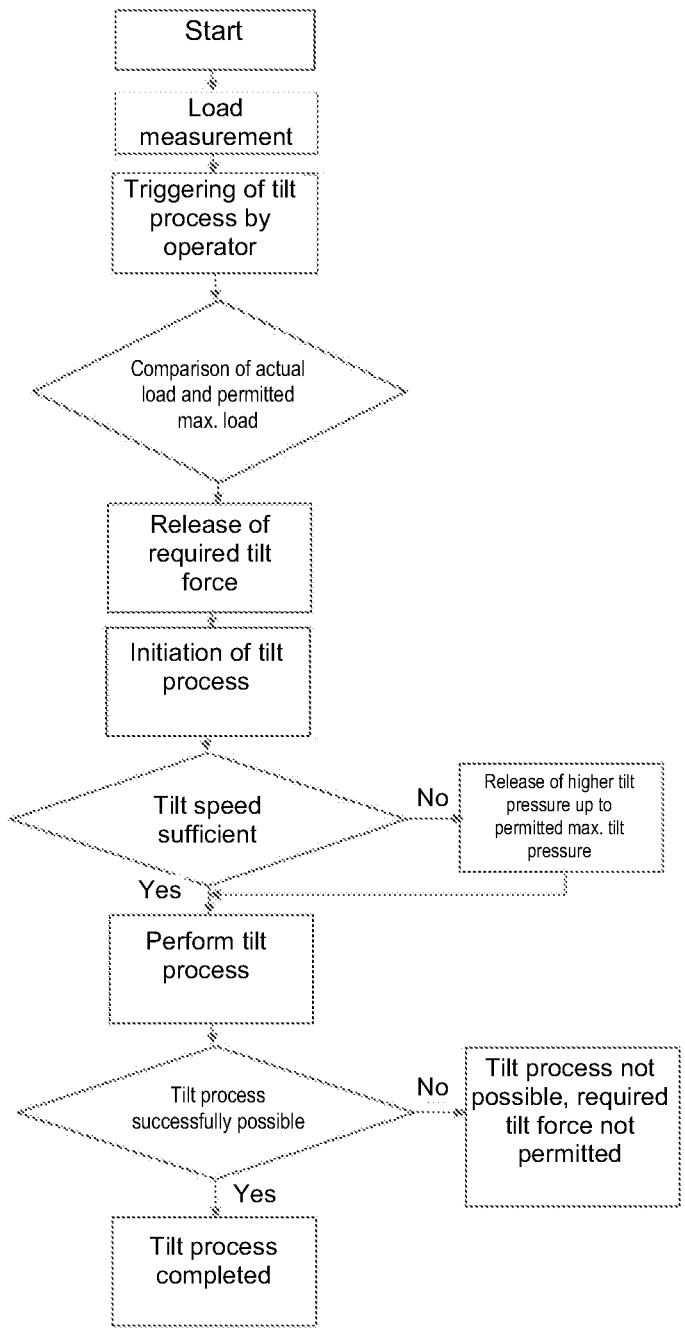
FIG. 2b: a further flowchart of the method in accordance with the invention for a further application case.

FIG. 2b shows the flowchart for a specific application case in which, after a setting of the limit pressure of the pressure relief valve 80 has been made, the resulting tilt speed does not correspond to a desired nominal speed. The current load of the bed 2 is also constantly detected by the weighing device 20 here. After the triggering of the tilt process by the operator using the control element 50, a comparison of the actual load with the stored maximum permitted load takes place. In a similar manner to the embodiment of FIG. 2a, the release of the required tilt force by the control 10 takes place here as does the initiation of the tilt process by the hydraulic control device 30.

A check is, however, made during the tilt process whether the achieved tilt speed, that is detected by means of a separate sensor system, corresponds to a predefined desired tilt speed of the bed 2. If this is the case, the tilt process is carried out up to the end of the unloading process by the actuation of the tilt cylinders 40. If, however, the current tilt speed of the bed 2 is below the desired tilt speed, an increase of the limit pressure of the pressure relief valve 80 takes place by the control 10 to thereby be able to apply a higher tilt force onto the bed 2 until the desired nominal tilt speed is reached.

It must, however, be noted here that an increase of the limit pressure of the pressure relief valve 80 can only take place up to a predefined first maximum tilt pressure at which an overload of individual hydraulic components and damage thereto is avoided.

Figure 2C:
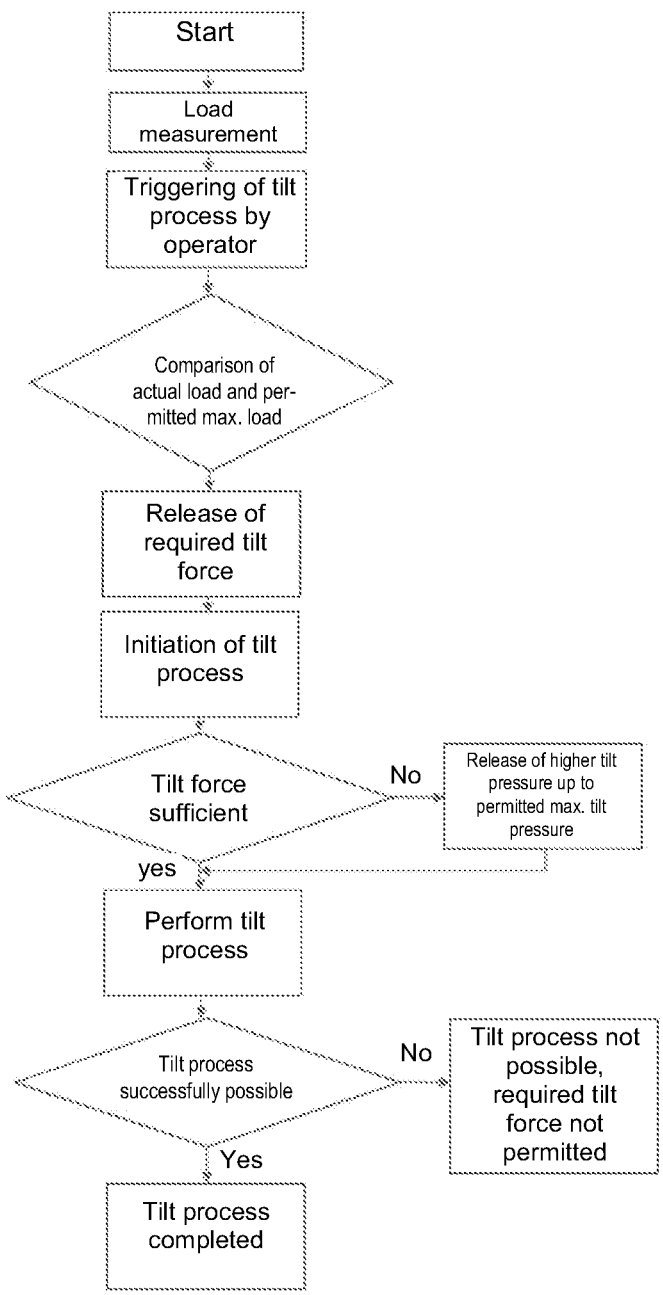
FIG. 2c: a further flowchart of the method in accordance with the invention for a third application case.

FIG. 2c shows a further application case of the method in accordance with the invention. The release of the required tilt force by the control 10 also takes place here as does the initiation of the tilt process by the hydraulic control device 30. If it is, however, found on the following tilt process that the set tilt force is not sufficient, due to the selected limit pressure, to lift the bed accordingly, a higher tilt pressure is released by the control 10 by raising the limit pressure of the pressure relief valve 80; however, only up to a predefined first maximum tilt pressure. If an increase is possible to the extent that the actuators 40 can lift the bed 2 accordingly, the tilt process is terminated up to the unloading of the bed 2. Otherwise the process is aborted and a communication is given to the operator that the required tilt force is not permitted.

Figure 3:
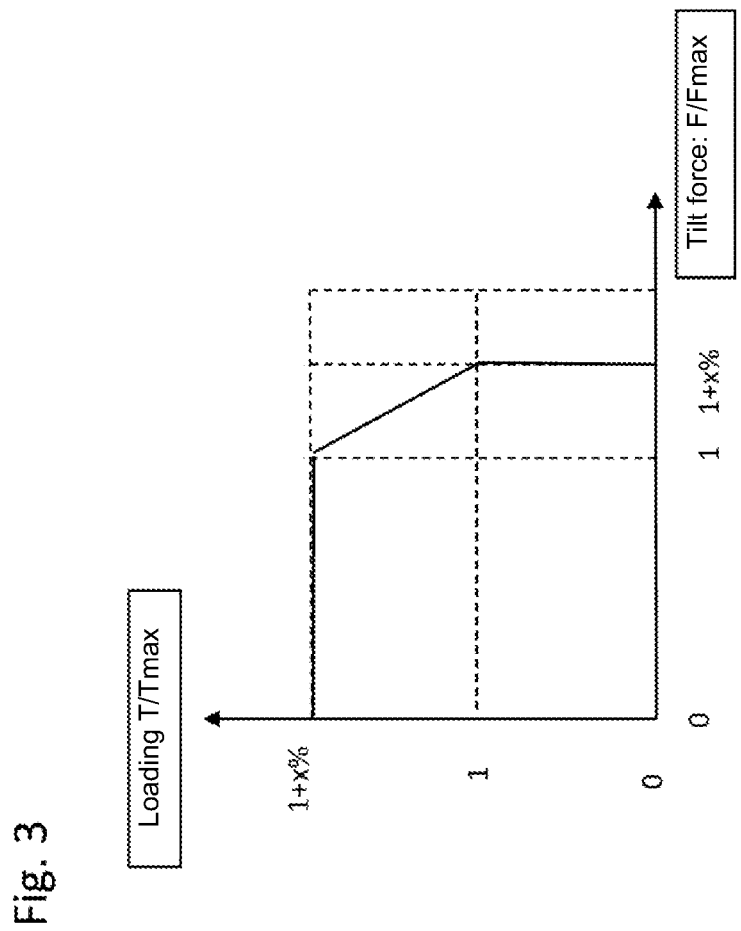
FIG. 3: a diagram representation to illustrate the relationship between the tilt force and the load.

FIG. 3 should briefly show the relationship between the load of the bed 2 and the required tilt force. A required nominal tilt force is determined and released in dependence on the actual load state, but only up to a first maximum tilt force. If the maximum permitted load is exceeded, the tilt force is set to a predefined second maximum tilt force.

The invention claimed is:

1. A construction machine having at least one material receiver adjustable by at least one hydraulic actuator for unloading, with required feed pressure for the actuator actuation provided by a hydraulic circuit of the construction machine and limited to a limit pressure by at least one pressure limiting device, wherein the construction machine comprises a weighing system for determining the current load weight of a material receiver, a control for the hydraulic circuit is provided to adapt the limit pressure of the pressure limiting device in dependence on a determined load weight, and the pressure limiting device comprises at least one pre-controllable pressure relief valve interconnected to the feed pressure line of the actuator, and whose opening pressure can be electrically and/or hydraulically set to the respective limit pressure by the control.

2. A construction machine in accordance with claim 1, wherein the control adapts the limit pressure in dependence on the load weight to an associated reference limit pressure, with the reference limit pressure being stored within the control and/or being able to be calculated by it.

3. A construction machine in accordance with claim 1, wherein the actual adjustment speed of the material receiver can be detected by the control by a sensor system, with the control being configured to initiate an increase of the set limit pressure when the determined load weight does not exceed a permitted maximum load weight of the construction machine and the determined actual adjustment speed of the material receiver remains below a desired adjustment speed.

4. A construction machine in accordance with claim 1, wherein the control is adapted to initiate an increase of the set limit pressure when the determined load weight does not exceed a permitted maximum load weight of the construction machine and the current feed pressure is not sufficient to adjust the material receiver for unloading.

5. A construction machine in accordance with claim 1, wherein
at least one inclination sensor is provided and the control takes account of the detected vehicle inclination on the adaptation or setting of the limit pressure, and
an increase in the limit pressure is in particular initiated when the determined load weight does not exceed a permitted maximum load weight of the construction machine and a certain inclination of the construction machine with respect to the horizontal is determined.

6. A construction machine in accordance with claim 1, wherein the control is adapted such that the limit pressure is set or increased up to a first maximum limit pressure when the determined load weight does not exceed a permitted maximum load weight of the construction machine and the limit pressure is set up to a second maximum limit pressure when the determined load weight exceeds a permitted maximum load weight of the construction machine.

7. A construction machine in accordance with claim 1, wherein the construction machine is a dump truck, in particular an articulated dump truck, and the at least one actuator serves the adjustment of the bed, with the weighing system detecting the load weight of the bed.

8. A method of operating a construction machine according to claim 1 for earthmoving, comprising
adjusting said at least one material receiver by said at least one hydraulic actuator for unloading, and
limiting hydraulic feed pressure of the actuator to a limit pressure determined in dependence on detected actual load weight of the material receiver.

9. A method in accordance with claim 8, wherein the set limit pressure is increased up to a maximum limit pressure if the actual load weight does not exceed a permitted load weight and the resulting adjustment force for the adjustment movement of the material receiver is not sufficient and/or the resulting adjustment speed is below a nominal adjustment speed and/or a certain inclination of the vehicle with respect to the horizontal is recognized.

10. A construction machine in accordance with claim 1, additionally comprising
a hydraulic pump (61),
an electrically-actuatable proportional pressure control valve (90) connected to an input side of the hydraulic pump (61) and setting the limit pressure of the pressure relief valve (80).

11. A construction machine in accordance with claim 10, additionally comprising
an adjustment pump (60), and
a ski selector valve (70) coupling the adjustment pump (60) to actuator (40), with the actuator (40) extended, retracted or stopped in position depending upon three switching states of the ski selector valve (70),
with the pressure relief valve (80) connecting a high pressure side of the adjustment pump (60) to a hydraulic tank.

12. A construction machine in accordance with claim 11, wherein the pressure relief valve (80) is directly connected between the ski selector pump (70) and actuator (40), and directly connected to the hydraulic tank, and
the electrically-actuatable proportional pressure control valve (90) is directly connected to the ski selector valve (70) through an engine control unit.

* * * * *